United States Patent [19]
Jayakumar

[11] Patent Number: 5,889,978
[45] Date of Patent: Mar. 30, 1999

[54] EMULATION OF INTERRUPT CONTROL MECHANISM IN A MULTIPROCESSOR SYSTEM

[75] Inventor: Muthurajan Jayakumar, Sunnyvale, Calif.

[73] Assignee: Intel Corporation, Santa Clara, Calif.

[21] Appl. No.: 843,996

[22] Filed: Apr. 18, 1997

[51] Int. Cl.[6] .................................................. G06F 9/455
[52] U.S. Cl. ......................... 395/500; 395/733; 395/737
[58] Field of Search .................................. 395/500, 733, 395/737, 740, 290

[56] References Cited

U.S. PATENT DOCUMENTS

| | | | |
|---|---|---|---|
| 5,440,747 | 8/1995 | Kiuchi ..................................... | 395/740 |
| 5,517,626 | 5/1996 | Archer et al. ........................... | 395/290 |
| 5,737,579 | 4/1998 | Kimura et al. .......................... | 395/500 |

OTHER PUBLICATIONS

PSIM –A Simulator for Concurrent Execution of Net–Based Programs, Joerg and Campbell, Feb. 1995.

*Primary Examiner*—Kevin J. Teska
*Assistant Examiner*—Dan Fiul
*Attorney, Agent, or Firm*—Blakely, Sokoloff, Taylor & Zafman LLP

[57] ABSTRACT

A multiprocessor computer system that includes an emulation feature for lowest priority processor software compatibility while providing fault tolerance includes first and second processors coupled to a system bus that handles transmission of interruption messages within the system. An instruction resulting in an interruption which specifies an interrupt feature causes microcode to generate a trap. A trap handling routine reads ID information from a register of the first processor, and places it in a target processor ID field of an interruption message which gets broadcast on the system bus. The first processor eventually accepts the interruption message and is designated as the processor in the system which handles the interruption.

11 Claims, 3 Drawing Sheets

EMULATION OF INTERRUPT CONTROL MECHANISM IN A MULTIPROCESSOR SYSTEM

FIELD OF THE INVENTION

The present invention relates generally to the field of microprocessor based computer systems. More specifically, the invention relates to an improved multiprocessor system for handling of the interrupt requests.

BACKGROUND OF THE INVENTION

In the field of microprocessors, interruptions are events that occur during instruction processing, causing the flow control to be passed to an interruption handling routine. In the process, certain processor state information is saved automatically by the hardware which normally resides on the same integrated circuit as the central processing unit (CPU). Upon completion of interrupt processing, a "return from interruption" is executed, which restores the saved processor state, an execution proceeds from the interruption instruction. Every complex computer system includes some sort of mechanism for dealing with interruptions.

In the past, small computers based upon the popular i386 and i486 microprocessors typically had no need to be concerned with interprocessor interrupt communications. These systems were intended to communicate via a system bus, but the system bus could not be used for interprocessor interrupt communications because the bus architecture needed to maintain backward compatibility with the older x86 platform. This situation, for example, led to the development of a separate bus, dedicated bus designed to handle the function of interprocessor interrupt communications without disturbing the existing platform or interfering with backward compatibility. By way of example, this approach is disclosed in U.S. Pat. No. 5,511,200 which is assigned to the assignee of the present application.

Other approaches to the problem of interrupt handling include U.S. Pat. No. 4,495,569, which teaches a multiprocessor system with an interrupt controller for applying an interrupt to a destination processor. A bus interface interrupt arrangement which provides separate interrupt controllers for each bus in a multi-bus computer system is disclosed in U.S. Pat. No. 5,134,706. Yet another approach to the problem is taught in U.S. Pat. No. 5,155,853 which describes an interrupt controller integrated with a CPU. The interrupt controller unit responds to interrupt request signals and starts an interrupt handling routine.

In multiprocessor systems based upon the Intel Architecture™, the use of a dedicated processor interrupt control (PIC) bus gained popularity. Consequently there developed an entire protocol for governing the operation of the PIC bus. For instance, certain features were created in the multiprocessor system environment which were quickly adopted by software developers. One such feature was the arbitration concept of a lowest priority destination (LPD). According to the LPD arbitration scheme, an interrupt generated within the multiprocessor system gets transferred to the least busy processor (i.e., the lowest priority processor) for interrupt handling. In other words, the least busy processor in the system is identified according to the LPD scheme, and that processor is then given the task of handling interrupts. Note that priority in such a system is dynamic, that is, a processor may be extremely busy at one moment (i.e., highest priority) and idle the next moment.

The success of the PIC architecture led to its inclusion in multiprocessor systems based upon the Pentium® and Pentium® PrO™ multiprocessor computer systems. Both processors have been designed to be compatible with a PIC bus.

One of the problems that has developed as CPU frequency continues to increase and power supply potentials decrease, is that the limitations inherent in the PIC bus architecture have become evident. To be specific, the PIC bus architecture has certain electrical requirements for voltage swings, operating frequencies, voltage potentials, etc., that are not compatible with more advanced, high frequency, low power multiprocessor systems. As studied another way the electrical nature of the PIC bus is limited by its dependence upon over voltage level requirements which are not compatible with more modern multiprocessor system designs. The challenge facing system designers is how to incorporate hardware enhancements without sacrificing software compatibility such as lowest priority processor targeting which is needed for x86 compatibility. In other words, the added enhancements in hardware and software for future microprocessor systems mandates departure from the traditional PIC bus architecture. But at the same time, future processor proliferations must support PIC bus architectural features, such as targeting lowest priority processor, to achieve full binary compatibility with existing software.

As will be seen, the present invention provides a mechanism for emulation of lowest priority processor in a multiprocessor system in which interprocessor interrupts are communicated across a high speed system bus.

BRIEF DESCRIPTION OF THE DRAWINGS

The invention will be understood upon reading the following detailed description in conjunction with the drawings in which.

SUMMARY OF THE INVENTION

The present invention is a multiprocessor computer system that includes an emulation feature for lowest priority processor software compatibility while providing fault tolerance.

In one embodiment, the system includes first and second processors coupled to a system bus that handles transmission of interruption messages within the system. When an instruction is decoded by the first processor, and that instruction specifies an interrupt feature, microcode in the first processor causes a trap to occur. In response to the trap, microcode reads ID information from a register of the first processor. This ID information serves as the first processor's physical name. The first processor then broadcasts an interruption message on the system bus. The interruption message includes the ID information read from the ID register.

This ID information is included in a target processor ID field of the message.

After being broadcast onto the system bus, the first processor eventually accepts the interruption message, since the target processor ID field matches the first processor's physical name. The first processor is thereby designated as the processor in the MP system which handles the interruption.

DETAILED DESCRIPTION

Figure 1:
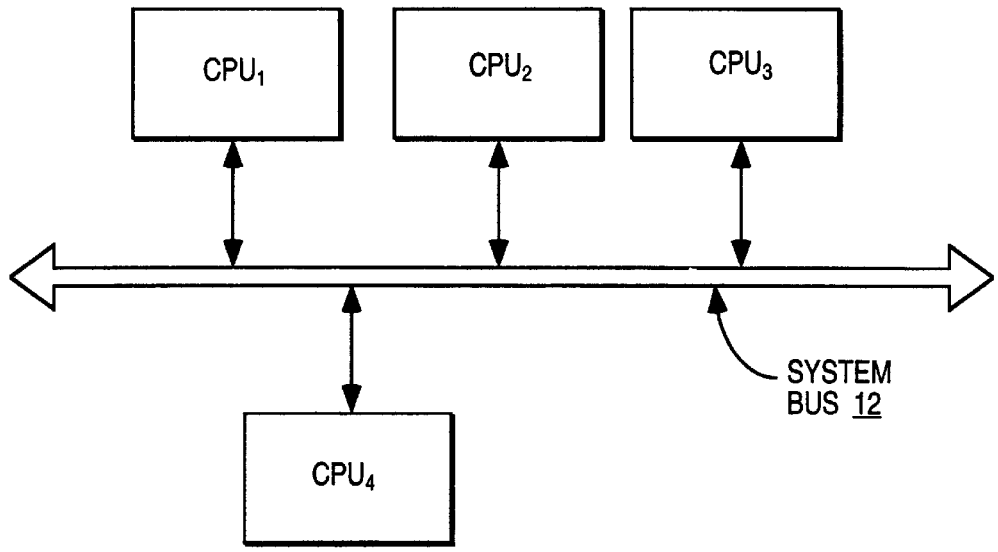
FIG. 1 is a high level block diagram of a multiprocessor system operating in accordance with the present invention.

In FIG. 1 there is shown a general block diagram of a computer system 10 comprising four processors ($CPU_{1-4}$), each of which is coupled to a common system bus 12. In one embodiment of the present invention, system bus 12 comprises a 250 MT/SEC or higher system bus that also is utilized for interprocessor interrupt communications. In other words, system bus 12 is designed such that interrupt messages are sent over the system bus.

For purposes of understanding the present invention, different classes that may occur during instruction processing include: faults, traps, interrupts, and aborts. A fault occurs when the current bundle of instructions contains a certain instruction which requests an action that cannot or should not be carried out, or system intervention is otherwise required before the instruction is executed. Faults are synchronous with respect to the instruction stream. The processor completes state changes that have occurred in instructions prior to the faulting instruction. The faulting and subsequent instructions, however, have not effect on the machine state. Traps are also synchronous with respect to the instruction stream and occur when the instruction just executed requires system intervention. The trapping instruction and are previous instructions are completed. Subsequent instructions have no effect on machine state. Interrupts occur when an external or independent entity, e.g., an input/output (I/O) device, timer, event, etc., requires attention. Interrupts are asynchronous with respect to the instruction stream. All previous instructions appear to have completed. The current and subsequent instructions have no effect on machine state. Finally, an abort occurs when the processor detects an internal malfunction or a reset event. Aborts can be either synchronous or asynchronous with respect to the instruction stream, and may cause the processor to suspend the instruction stream at an unpredictable location.

Figure 2:
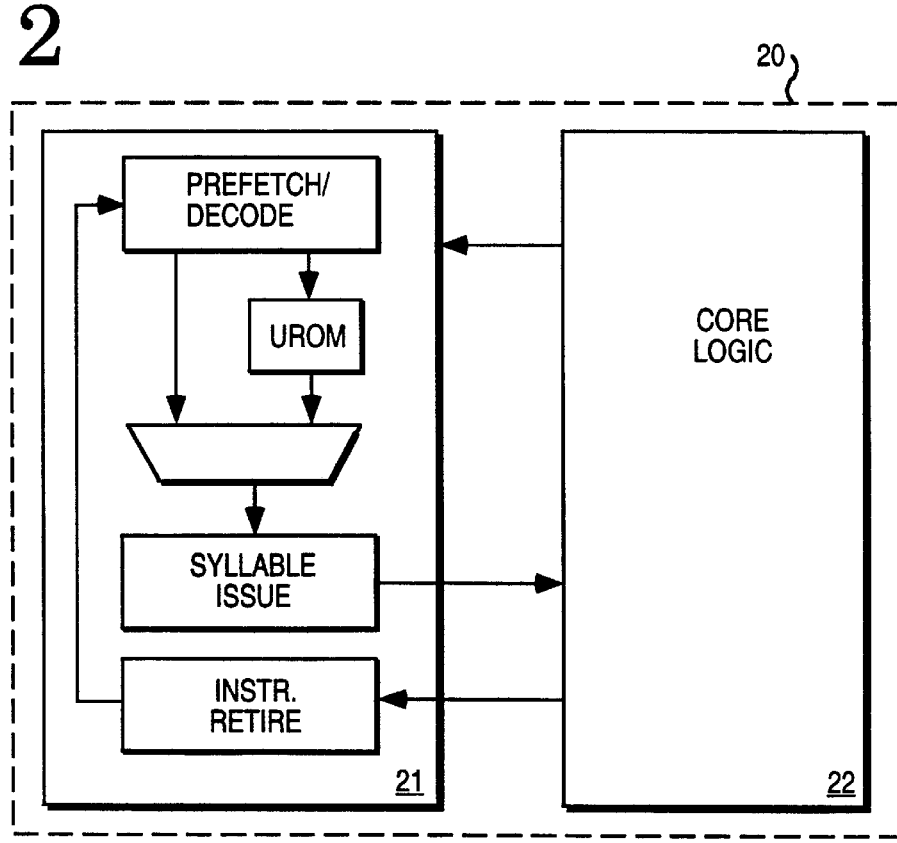
FIG. 2 is an architectural level block diagram of one embodiment of a processor which incorporates the present invention.

FIG. 2 is a block diagram illustrating the basic architecture of a processor 20 implemented in accordance with one embodiment of the present invention. The architecture of processor 20 splits execution responsibilities between a core logic section 22 that operates in association with a first instruction set architecture, and a section 21 that emulates a different, second instruction set architecture. In one particular embodiment, section 21 specifically decodes Intel Architecture™ instructions. Core logic section 22 provides instructions in accordance with a first instruction set architecture, as well as data, execution resources and a register set. Instructions compatible with the Intel Architecture™, are decoded in section 21, which also generates a sequence of internal microinstructions that are translated into a set of syllables that are issued to core logic section 22. These are then executed by the core logic execution units in section 22. Thus, the microarchitecture of processor 20 implements Intel Architecture™ macroinstructions with microcode sequences where a majority of the macroinstructions comprise code compatible with core logic section 22, along with additional microarchitectural specific control signals. It should be understood that the architecture of processor 20 is binary, code compatible but not necessarily backward PIN compatible. In other words, processor 20 could be implemented such that it is not plug compatible with older computer systems. In this respect, processor 20 does not implement the traditional dedicated interrupt control bus associated with prior art PIC architectures. Rather, processor 20 is designed to operate in a system such as that shown in FIG. 1 in which interrupt messages are communicated over system bus 12. Code compatibility to support architectural features such as lowest priority processor arbitration is achieved from the present invention through the use of microcode, which directs the lowest priority target to the CPU running the software at the time. The microcode accesses a special CPU identification (CPU ID) register and obtains an ID value. From there it then targets itself for lowest priority processor target. Since the lowest priority target is transparent to software, this implementation ensures x86 software compatibility while providing fault tolerance in a multiprocessor system. Because microcode is atomic by its very nature, coherency issues are obviated in the interprocessor interrupt communication scheme of the present invention. At this point, it should be appreciated by practitioners in the art that this invention has an important advantage in that it is encapsulated within the CPU requiring no modifications to the system's hardware application layer (HAL) with no additional hardware cost. This means that it may incorporated into multiprocessor systems without requiring additional support by other platform system components.

Figure 3:
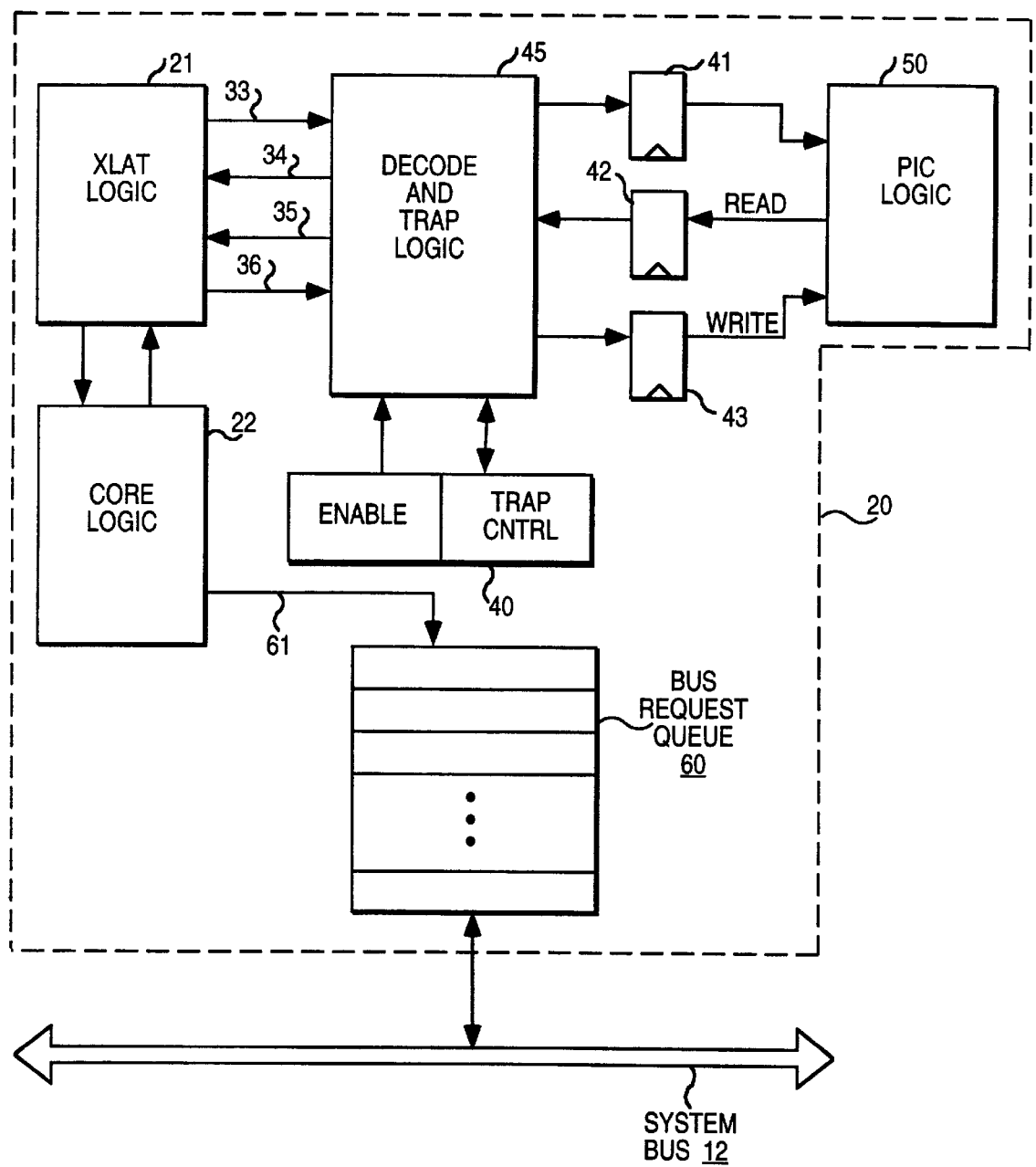
FIG. 3 is a detailed block diagram of the emulation mechanism implemented in one embodiment of a microprocessor in accordance with the present invention.

Referring now to FIG. 3, there is shown a block diagram of various internal functional units of processor 20 which are relevant to the present invention. Because operating system software developers have included features such as lowest priority processor target into their code, processor 20 may execute software and at any given moment, encounter an instruction with a lowest priority addressing mode specified. In this respect, the translation logic in section 21 works in conjunction with the core logic section 22 of the processor to fetch and decode instructions that are compatible with the Intel instruction set architecture, which has low priority addressing mode specified. The decoding and translation occurs in section 21 for this code. When an instruction is encountered with lowest priority addressing mode specified, translation logic in section 21 signals the decode and trap logic 45 via a signal transmitted on line 33. In response to encountering an instruction with lowest priority addressing mode specified, decode and trap logic 45 generates a trap. Microcode in section 21 includes various steps and instructions that initiates handling of the trap in trap control unit 40. The microcode uses existing PIC logic contained in unit 50 which also stores the CPU ID. The CPU reads the ID register and then places the ID information into the instruction stream so that the CPU running that generated the interruption is the same CPU that handles the trap.

Latches 41–43 are utilized for communicating between decode and trap logic unit 45 and PIC logic unit 50. For example, latch 41 holds the request information for accessing the CPU ID register within PIC logic unit 50. Reading and writing of information from/to PIC logic unit 50 occurs via latches 42 and 43. Microtrap status and control register ID number information is communicated to translation logic within section 21 via signal lines 34 and 35, respectively. Control register access is signaled via line 36.

It is appreciated that any CPU has associated with it a number of control registers. Outside of the CPU, there may exist I/O registers, memory registers, and memory-mapped I/O registers, of which the conventional PIC architecture was one such element. In the embodiment of FIG. 3, the PIC registers are implemented as control registers within unit 50. This means that there is a need to translate the memory address of the PIC registers to the control register number associated with core logic section 22.

Figure 4A:
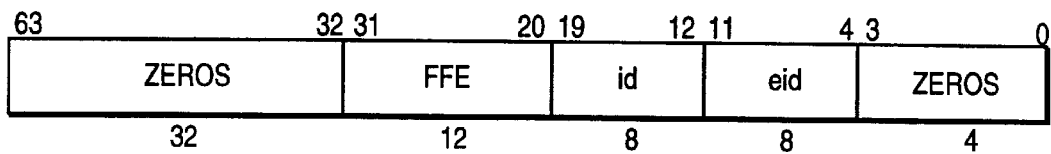
FIG. 4A is an address format for external interrupt messages in accordance with one embodiment of the present invention.
Figure 4B:
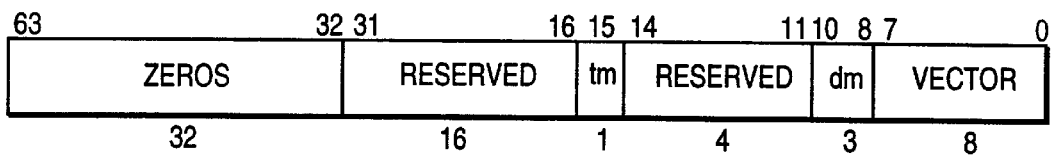
FIG. 4B illustrates the data format for external interrupt messages in accordance with one embodiment of the present invention.

With reference now to FIG. 4A, there is shown an address format for external interrupt messages in accordance with one embodiment of the present invention. FIG. 4B illustrates the data format for external interrupt messages. The address processor identifier fields EID and ID specify the target processor and they are defined in Table 1, below.

TABLE 1

| FIELD | BITS | DESCRIPTION |
| --- | --- | --- |
| EID | 23:16 | Extended Identifier: Processors receiving an interrupt use LID.eid filed, along with the LID.id field, to determine whether or not to accept the interrupt. This field is initialized to zero on reset. LID.eid filed corresponds to physical address bit {11:4} of the interrupt message. |
| ID | 31:24 | Identifier: Processors receiving an interrupt use LID.id field, along with LID.eid field, to determine whether or not to accept the interrupt. This field is initialized to some implementation dependent value upon processor reset. LID.id field corresponds to physical address bits {19:12} of the interrupt message. |

Note that if the EID field contains all 0's and the ID field is all 1's, the interrupt is broadcasted to all processors in the multiprocessor system.

Stores to the physical address range 0X0000 0000 FFEX XXXX that are unaligned not 8-bytes, or are mapped through cacheable memory, are illegal and may result in either unpredictable behavior or a machine check abort.

Figure 5:
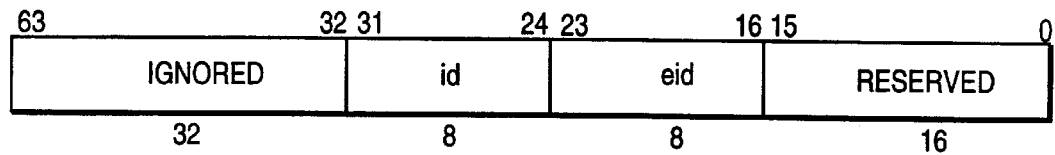
FIG. 5 shows the structure of the local identification register utilized in one embodiment of the present invention.

The LID register is contained within PIC logic unit 50 and stores the processor's local identifier fields. These fields service the processor's physical name in all external interrupt messages. The LID register is loaded at power-up by firmware based on the processor's physical location. A data serialization operation can be used to ensure the LID register has been updated for future arriving interrupts. The structure of the LID register is illustrated in FIG. 5, and a description of the EID and ID fields of the local identifier register are described in Table 1. It should be understood that the LID register in PIC logic unit 50 is a read-write register than can only be accessed at privileged level 0, otherwise, a privileged operation fault is generated.

As discussed previously, instead of utilizing a dedicated interrupt bus, the multiprocessor system of the present invention sends interrupt messages across the system bus. This is implemented using the CPU's bus request path for sending the interrupt message out onto system bus 12 as illustrated in FIG. 3. A bus request queue 60 is utilized to stack interrupt messages for broadcast onto system bus 12 from core logic unit 22 via line 61. In accordance with the present invention, when processor 20 sends an interprocessor interrupt message onto bus 12, all of the other processors in the system will ignore it and it will come back to CPU 20 where it originated from. This means that CPU 20 will handle the interrupt request which it broadcast onto system bus 12. So when lowest priority information is encountered in the code being executed on processor 20, processor 20 will automatically be designated as the lowest priority processor. It should be understood, however, that when the same software code is executed by a different CPU in the multiprocessor system, the interrupt generated from the instruction containing the lowest priority information will go to that CPU. Practitioners in the art will appreciate that this solution is scalable to any number of CPU's without any issues of coherency maintenance arising.

What is claimed is:

1. In a multiprocessor computer system which includes first and second processors, in a system bus for information transfer between the processors, a method of emulating an interruption arbitration feature specified in an instruction of a program being executed on the first processor, the instruction causing an interruption, the method comprising the steps of:

(a) decoding the instruction in the first processor;

(b) causing a trap to occur in the first processor;

(c) responsive to the trap, reading identification (ID) information from an ID register of the first processor, the ID information serving as the first processors physical name;

(d) broadcasting, on the system bus, an interrupt message which includes the ID information;

(e) accepting the interrupt message by the first processor.

2. The method according to claim 1 further comprising the step of:

(f) handling the interruption by the first processor.

3. The method according to claim 2 wherein the ID information included in the interrupt message is contained in a target processor identification field.

4. The method according to claim 1 further comprising the step, after step (d), of:

ignoring the interrupt message by the second processor.

5. The method according to claim 1 wherein steps (b) and (c) are implemented by microcode in the first processor.

6. The method according to claim 1 further comprising the initial step of:

loading the ID registers of the first and second processors based upon the physical locations of the first and second processors.

7. The method according to claim 5 wherein the loading step occurs at power up or reset of the multiprocessor computer system.

8. A multiprocessor (MP) computer system which emulates an interruption arbitration feature, the MP system comprising:

a system bus;

a plurality of processors, at least a first processor in the MP system including:

a decoder that decodes instructions of a program;

trap logic that causes a trap to occur responsive to decoding an instruction which specifies a lowest priority addressing mode, the instruction causing an interruption;

an ID register which contains ID information that serves as the first processor's physical name;

micro code which responds to the trap by reading the ID information from the ID register;

a bus request queue that holds messages transmitted via is the system bus; and core logic that broadcasts an interruption message on the system bus via the bus request queue, the interruption message including the ID information read from the ID register by the micro code; and wherein the core logic accepts back the interruption message so that the first processor is designated to handle the interruption.

9. The MP system of claim 8 wherein the interruption comprising an interprocessor interrupt.

10. The MP system of claim 8 wherein the first processor further comprises an interrupt handling routine which handles the interruption following acceptance of the interruption by the core logic.

11. The MP system of claim 8 further comprising latch logic for reading and writing ID information to the ID register.

* * * * *

UNITED STATES PATENT AND TRADEMARK OFFICE
CERTIFICATE OF CORRECTION

PATENT NO. : 5,889,978
DATED : March 30, 1999
INVENTOR(S) : Jayakumar

It is certified that error appears in the above-identified patent and that said Letters Patent is hereby corrected as shown below:

Column 6,
Line 63, delete "is".

Signed and Sealed this

Second Day of December, 2003

JAMES E. ROGAN
*Director of the United States Patent and Trademark Office*